United States Patent

Lauck et al.

[11] 3,812,925
[45] May 28, 1974

[54] HYDROSTATIC TRANSMISSION CONTROL SYSTEM

[75] Inventors: Robert B. Lauck, Southfield; Lawrence L. Meyer, Northville, both of Mich.; Charles H. Cargo, Nolanville, Tex.

[73] Assignee: Eaton Corporation, Cleveland, Ohio

[22] Filed: Mar. 1, 1973

[21] Appl. No.: 336,911

[52] U.S. Cl.................. 180/6.48, 60/97 E, 60/445
[51] Int. Cl...................... B62d 11/04, B15b 15/22
[58] Field of Search.................... 180/6.48, 6.3, 6.7; 60/97 E, 420, 445, 484

[56] References Cited
UNITED STATES PATENTS

| | | | |
|---|---|---|---|
| 3,085,403 | 4/1963 | Hamblin et al. | 180/6.48 X |
| 3,217,822 | 11/1965 | Ross | 180/6.48 |
| 3,295,620 | 1/1967 | Messenger | 180/6.7 |

Primary Examiner—David Schonberg
Assistant Examiner—John A. Pekar
Attorney, Agent, or Firm—Teagno & Toddy

[57] ABSTRACT

An improved straight tracking control system equalizes the output speeds of a pair of hydrostatic transmissions during straight forward movement of a vehicle. The control system includes a pump assembly having a housing which is rotated at a speed which varies as a function of variations in the speed of one of the tracks of the vehicle. This housing defines a pumping chamber in which a rotor is rotated at a speed which varies as a function of variations in the speed of the other track of the vehicle. When the vehicle is moving straight forward and the two tracks are being driven at the same speed, there is no relative rotation between the rotor and housing so that the pump assembly is ineffective to pump fluid. Upon acceleration of one of the tracks relative to the other and a resulting relative rotation between the housing and rotor, the pump assembly is effective to discharge fluid under pressure to a piston and cylinder assembly. This fluid actuates the piston and cylinder assembly to operate a valve. Operation of the valve ports fluid to an actuator assembly to vary the output speed of one of the hydrostatic transmissions in a manner so as to equalize the output speeds of the two hydrostatic transmissions. In one embodiment of the invention, a second piston and cylinder assembly is actuated to vary the output speed of a second hydrostatic transmission after the first piston and cylinder assembly has been actuated to vary the output speed of the first hydrostatic transmission.

18 Claims, 4 Drawing Figures

HYDROSTATIC TRANSMISSION CONTROL SYSTEM

BACKGROUND OF THE INVENTION

This invention relates generally to a hydrostatic transmission control system and more specifically to a straight tracking control system for equalizing the output speeds of a pair of hydrostatic transmissions.

There are many different types of straight tracking control systems for equalizing output speeds of a pair of hydrostatic transmissions. One of these known control systems is disclosed in U.S. patent application Ser. No. 369,468 filed June 13, 1973, by Harold R. Ward and entitled Hydrostatic Transmission Control System and includes a valve assembly having a pair of valve members which are driven by input shafts connected with associated hydrostatic transmissions. If one of the hydrostatic transmissions should accelerate relative to the other hydrostatic transmission, the valve members are rotated relative to each other to port fluid under pressure to an actuator assembly which decreases the output speed of the accelerating hydrostatic transmission.

In addition, U.S. Pat. No. 3,085,403 discloses a straight tracking system in which a separate pump unit is driven by each of the tracks of a vehicle to effect actuation of a control valve to maintain the vehicle on a straight path. Finally, U.S. Pat. No. 3,247,919 discloses a straight tracking system wherein a differential is connected with both tracks of a vehicle and drives a pump to provide an output signal when a difference in speed exists between the two tracks.

SUMMARY OF THE PRESENT INVENTION

The present invention provides a new and improved control system which is utilized to effect the operation of a pair of hydrostatic transmissions at the same speed during straight forward movement of a vehicle. This control system includes a pump having a rotor which is rotated at a speed which varies as a function of variations in the speed at which a first track of the vehicle is driven. A rotatable housing encloses the rotor and is rotated at a speed which varies as a function of variations in a speed at which a second track of the vehicle is driven. As long as the two tracks of the vehicle are driven at the same speed, there is no relative rotation between the rotor and housing and the pump is ineffective to provide a fluid output signal. However, upon a variation in the speed of one of the tracks relative to the other track, relative rotation occurs between the rotor and housing. The pump is then effective to provide a fluid output signal which actuates a control assembly to vary the speed of one of the hydrostatic transmissions in a manner to equalize the speeds at which the two tracks are driven.

The control assembly includes a piston and cylinder assembly which is connected in fluid communication with the pump by a pair of conduits. Upon relative rotation between the rotor and housing in a first direction due to acceleration of one of the tracks relative to the other, fluid under pressure is discharged from the pump into one of the conduits to effect operation of the piston and cylinder assembly. Similarly, upon relative rotation between the rotor and housing in the opposite direction, fluid under pressure is discharged from the pump into the other conduit to effect operation of the piston and cylinder assembly in the opposite direction. The piston and cylinder assembly is connected with a valve which ports fluid under pressure to effect operation of an actuator assembly to vary the output speed of the associated hydrostatic transmission in a manner so as to tend to equalize the speeds at which the tracks are driven.

To enable the control assembly to quickly correct relatively large variations in the speed of one of the tracks relative to the other, a second piston and cylinder assembly may be utilized in association with the first piston and cylinder assembly. The second piston and cylinder assembly responds to a relatively high pressure output from the pump to vary the output speed of the second hydrostatic transmission.

Accordingly, it is the object of this invention to provide a new and improved hydrostatic transmission control system for equalizing the speed at which a pair of tracks of a vehicle are driven by a pair of hydrostatic transmissions and wherein the control system includes a pump having a rotor which is rotated at a speed which varies as a function of variations in which the speed at which the first track is driven, a housing which is rotated at a speed which varies as a function of variations in a speed at which the second track is driven, and a control apparatus connected with the pump to vary the speed at which at least one of the hydrostatic transmissions drives one of the tracks in response to an output from the pump.

Another object of this invention is to provide a new and improved hydrostatic transmission control system as set forth in the next preceeding object and wherein the control apparatus includes a first piston and cylinder assembly for effecting a variation in the output speed of the first hydrostatic transmission in response to a fluid output from the pump and a second piston and cylinder assembly for effecting a variation in the output speed of the second hydrostatic transmission in response to a fluid output from the pump.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

Figure 1:
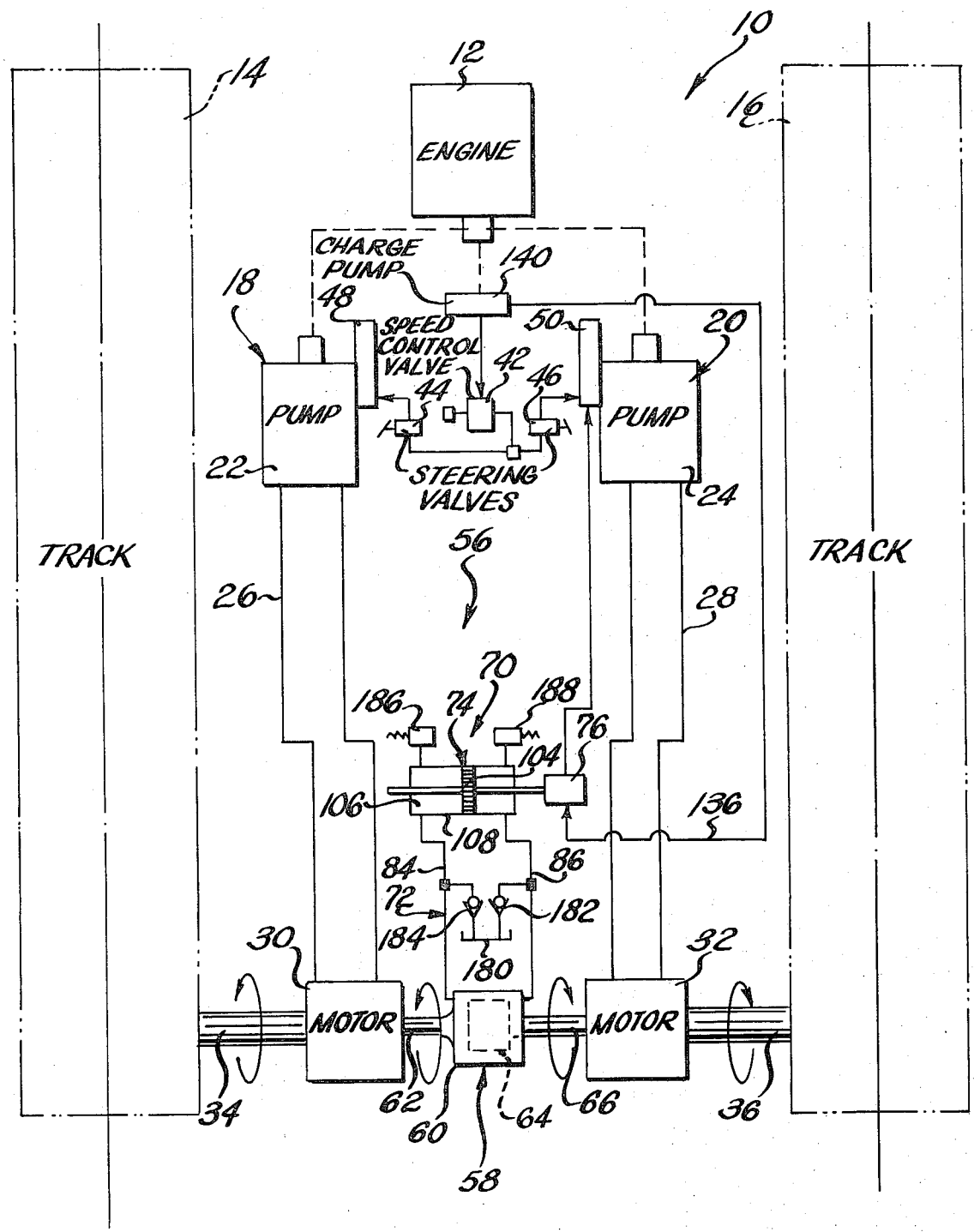
FIG. 1 is a schematic illustration of a vehicle having a hydrostatic transmission control system constructed in accordance with the present invention.

A vehicle 10 (FIG. 1) has an engine 12 which drives left and right hand tracks 14 and 16 through left and right hand hydrostatic transmissions 18 and 20. The hydrostatic transmissions 18 and 20 include variable displacement pump units 22 and 24 which are driven by the engine 12 and transmit fluid under pressure through hydraulic circuits 26 and 28 to motor units 30 and 32. The motor units 30 and 32 are connected with the tracks 14 and 16 by output shafts 34 and 36.

When the vehicle 10 is being driven along a straight path, the input to output speed ratios of the hydrostatic transmissions 16 and 18 are simultaneously changed by equal amounts by operation of a speed control valve 42 which is connected with the hydrostatic transmissions through steering control valves 44 and 46. Assuming that the vehicle is moving along a straight path, the speed control valve 42 can be operated to increase the control fluid pressure transmitted through the steering valves 44 and 46 to pressure responsive pump actuator assemblies 48 and 50. This causes the actuator assemblies 48 and 50 to increase the effective displacement of the pump units 18 and 20 by equal amounts to thereby increase the speed at which the tracks 14 and 16 are driven by the motors 30 and 32.

If it is desired to turn the vehicle, one of the steering control valves 44 or 46 is actuated to reduce the output speed of the associated one of the hydrostatic transmissions 18 or 20 connected with the track 14 or 16 on the side toward which the vehicle is to turn. The general construction of the speed control valve, steering control valves 44 and 46, actuator assemblies 48 and 50 and the pump units 22 and 24 are similar to that disclosed in U.S. Patent Application Ser. No. 248,685 filed on Apr. 28, 1972 by Edward Bojas and Harold R. Ward and entitled Hydrostatic Transmission Drive System.

In accordance with the present invention, a straight tracking control system 56 equalizes the output speeds of the two motor units 30 and 32 when the vehicle 10 is driven along a straight path. The straight tracking control system 56 includes a pump assembly 58 having a rotatable housing 60 FIGS. 1 and 2) which is rotated by an input shaft 62 at a speed which is proportional to the speed at which the motor unit 30 drives the left hand track 14. Located within the housing 60 is a rotor 64 which is rotated by an input shaft 66 at a speed which is proportional to the speed at which the motor unit 32 drives the right hand track 16.

If the two tracks 14 and 16 are being driven at the same speed by the two motor units 30 and 32, the housing 60 and rotor 64 are rotated at the same speed and the pump assembly 58 is ineffective to actuate a control assembly 70. However, when one of the tracks is driven faster than the other track, relative rotation occurs between the housing 60 and rotor 64. This relative rotation causes the pump assembly 58 to discharge fluid into a conduit arrangement 72 which connects the pump assembly 58 in fluid communication with the control assembly 70. Fluid conducted through the conduit arrangement 72 effects operation of a piston and cylinder assembly 74 in the control assembly 70 to actuate a valve 76. Actuation of valve 76 ports fluid under pressure to the right hand actuator assembly 50 to vary the output speed of the right hand hydrostatic transmission 20 in a manner so as to equalize the speed at which the tracks 14 and 16 are driven.

The pump assembly 58 is of the well known reversible rotary type and includes an exterior casing 80 (FIG. 2) which rotatably supports the housing 60. The housing 60 defines a pumping chamber 82 in which the rotor 64 is disposed. The pumping chamber 82 is connected in fluid communication with conduits 84 and 86 in the conduit arrangement 72 by passages 90 and 92 formed in the casing 80 and annular manifold rings 94 and 96 and passage 98 and 100 formed in the housing 60.

Upon relative rotation between the housing 60 and rotor 64 in a first direction, fluid is drawn into the pumping chamber 82 from the conduit 84 and is discharged from the pumping chamber to the conduit 86. Similarly, upon relative rotation between the housing 60 and rotor 64 in the opposite direction, fluid is drawn into the pumping chamber 82 from the conduit 86 and is discharged from the pumping chamber to the conduit 84. Then pump assembly 58 could have any suitable construction as long as the housing 60 and rotor 64 are both rotatable relative to each other and the casing 80.

If the track 14 (FIG. 1) accelerates relative to the track 16 during straight forward movement of the vehicle 10, the housing 60 is rotated at a higher speed by the input shaft 62 than the rotor 64. This results in a drawing of fluid from the conduit 84 into the pumping chamber 82 and a discharge of fluid from the pumping chamber to the conduit 86. Similarly, if the track 16 accelerates relative to the track 14, the rotor 64 is rotated at a higher speed than the housing 60. This results in the drawing of fluid from the conduit 86 to the pumping chamber 82 and a discharging of fluid from the pumping chamber 82 to the conduit 84. The rate of discharge of fluid from the pumping chamber 82 to either the conduit 84 or 86 is proportional to the rate of relative rotation between the rotor 64 and housing 60.

When the track 14 accelerates relative to the track 16, fluid discharged from the pump assembly 58 into the conduit 86 moves a piston 104 in the piston and cylinder assembly 74 toward the right (as viewed in FIG. 3) in a chamber 106. This movement of the piston 104 actuates the valve assembly 76 to increase the speed at which the hydrostatic transmission 20 drives the track 16. Similarly, when the track 16 accelerates relative to the track 14, the pump assembly 58 discharges fluid into the conduit 84 to effect movement of the piston 104 to the left (as viewed in FIG. 3). This movement of the piston 104 actuates the valve assembly 76 to reduce the output speed of the hydrostatic transmission 20.

Actuation of the valve assembly 86 ports fluid under pressure to operate the actuator assembly 50 to either increase or decrease the effective displacement of the pump unit 24 and the output speed of the hydrostatic transmission 20. During forward operation of the hydrostatic transmission 20, a swash-plate 118 of the pump unit 24 is in the position shown in dashed lines in FIG. 3. To reduce the effective displacement of the pump unit 24 and the output speed of the right hand hydrostatic transmission 20, it is necessary to move a piston 122 from the position shown in dashed lines in FIG. 3 toward the neutral position shown in solid lines in FIG. 3. Similarly, to increase the output speed of the hydrostatic transmission 20, it is merely necessary to move the piston 122 further away from the neutral position to thereby increase the effective displacement of the pump unit 24.

Upon acceleration of the track 14 and actuation of the valve assembly 76 by the piston and cylinder assembly 74, fluid is ported to the actuator assembly 50 to move the piston 122 further away from the neutral position to increase the effective displacement of the pump unit 24. Thus, rightward movement of the piston 104 (as viewed in FIG. 3) moves a valve sleeve 126 relative to a stationary valve spool 130. This movement of the valve sleeve 126 relative to the valve spool 130 moves an opening or port 132 relative to an annular land 134 formed on the valve spool 130. This displacement of the valve sleeve 126 enables fluid to flow from a conduit 136, connected with a charge pump 140 (see FIG. 1), to the actuator assembly 50. Movement of the sleeve 126 is guided by the interaction between a stationary pin 141 and a linear slot 143 in the sleeve.

Movement of the valve sleeve 126 rightwardly (as viewed in FIG. 3) enables fluid to flow from the conduit 136 through a port 142 to the port 132. The fluid then flows from the port 132 to a conduit 148 which is connected in fluid communication with a chamber 150 at one end of the actuator assembly 50. At the same time, another port 154 in the sleeve 126 is moved out of alignment with a second stationary annular land 156 and is connected in fluid communication with an exhaust port 160. The port 154 is also connected in fluid communication, through a conduit 164, with opposite end chamber 166 in the actuator assembly 50. Of course, this results in further movement of the piston 122 away from the neutral position shown in solid lines to thereby increase the displacement of the pump unit 24.

As was previously explained, increasing the displacement of the pump unit 24 increases the output speed of the hydrostatic transmission 20 to thereby accelerate the track 16. When the speed of the track 16 is equal to the speed of the track 14, the rotor 64 is rotated by the input shaft 66 (see FIG. 1) at the same speed as the housing 60. Equalizing the relative speeds of rotation of the housing 60 and rotor 64 interrupts the discharge of fluid to the conduit 86. However, the piston 104 and the valve sleeve 126 remain in the actuated position. Therefore, the displacement of the pump unit 24 continues to increase even though the tracks 14 and 16 are being driven at the same speed.

As the speed of the track 16 exceeds the speed of the track 14, the rotor 64 is driven faster than the housing 60. This results in the discharging of fluid from the pump assembly 58 to the conduit 84. Fluid from the conduit 84 moves the piston 104 back toward the position shown in FIG. 3. As this occurs, the opening 132 is moved back into alignment with the land 134 on the stationary valve spool 130 to block fluid flow from the inlet 132 to the conduit 148. After a few oscillations or hunting operations, the piston 104 stabilizes in the center position shown in FIG. 3 to maintain the pump unit 24 with a displacement which is sufficient to cause the hydrostatic transmission 20 to have an output speed equal to the output speed of the hydrostatic transmission 18. If desired, stabilizing of the piston 104 could be promoted with a suitable centering spring arrangement.

Figure 3:
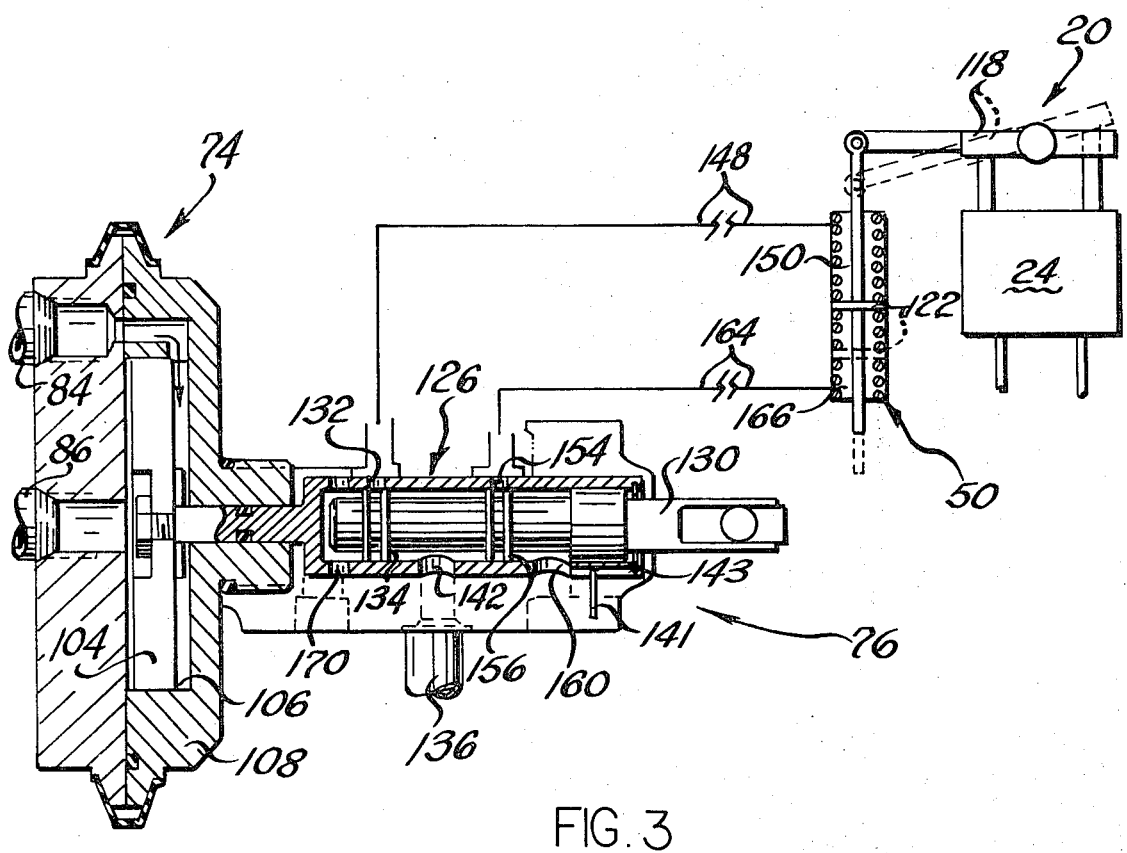
FIG. 3 is a sectional view illustrating the construction of a piston and cylinder assembly which is connected in fluid communication with the pump assembly of FIG. 2.

If the track 16 should accelerate relative to the track 14, the pump assembly 58 would discharge fluid under pressure to the conduit 84 to effect movement of the piston 104 to the left of the position shown in FIG. 3. This would move the valve sleeve 126 to connect the conduit 136 with the conduit 164 through the opening 154. The resulting increase in fluid pressure in chamber 166 and movement of the piston 122 toward the neutral position decreases the displacement of the motor unit 24 and output speed of the hydrostatic transmission 20. After a brief hunting operation the piston and cylinder assembly 74 and valve assembly 76 reach a stabilized condition in which the output speed of the hydrostatic transmission 20 is equal to the output speed of the hydrostatic transmission 18.

During operation of the pump assembly 58 to discharge fluid under pressure to the conduit 84, fluid is drawn into the pumping chamber 82 from the conduit 86. The conduit 86 is connected with drain or reservoir 180 (FIG. 1) through a check valve 182. Thus, when the pump assembly 58 is drawing fluid into the pumping chamber 82 from the conduit 86, fluid flows from the reservoir 180 through the check valve 82 into the conduit 86. However, when the direction relative rotation between the rotor 64 and housing 60 is reversed, the check valve 182 prevents fluid from being discharged from the conduit 86 back to the drain 180. A check valve 184 cooperates with the conduit 84 as in the same manner as in which the check valve 182 cooperates with the conduit 86.

To prevent the buildup of excessive fluid pressure in the piston chamber 106, a pair of high pressure relief valves 186 and 188 are connected with the piston chamber. If the fluid pressure in the chamber 106 reaches a predetermined maximum pressure, one of the valves 186 or 188 opens to relieve the fluid pressure in the chamber 106. Of course, makeup fluid is then drawn from the reservoir 180 through one of the check valves 182 or 184 to compensate for the fluid which is exhausted through a high pressure relief valve.

A single valve assembly 76 has been illustrated in association with the piston and cylinder assembly 74 to vary the output speed of the hydrostatic transmission 20. However, it is contemplated that a second valve assembly, of the same construction as the valve assembly 76, could be connected with the piston 104. This second valve assembly would be connected to the actuator assembly 48 to vary the output speed of the hydrostatic transmission 18 simultaneously with a variation in the output speed of the hydrostatic transmission 20. Of course, the second valve assembly would be connected with the actuator assembly 48 so as to effect an increase in the output speed of the hydrostatic transmission 18 as the output speed of the hydrostatic transmission 20 is decreased in response to actuation of the valve assembly 76. Similarly, the second valve assembly would effect a decrease in the output speed of the hydrostatic transmission 18 as the output speed of the hydrostatic transmission 20 is increased to thereby equalize the output speed of the hydrostatic transmissions.

The control assembly 70 is illustrated as being actuated by the pump assembly 58 to vary the output speed of only the right hand hydrostatic transmission 20. However, it is contemplated that under certain operating conditions the speed of one of the tracks may exceed the speed of the other track by a relatively large amount and the control assembly 71 may be unable to quickly correct for the large difference in speed. Accordingly, in the embodiment of the invention illustrated in FIG. 4 the control assembly 200 is effective to change the output speed of one of the hydrostatic transmissions, that is the right hand hydrostatic transmission 20 and then to change the output speed of the other hydrostatic transmission, that is the left hand hydrostatic transmission 18. Of course, the control assembly 200 is effective to increase the speed of one hydrostatic transmission and decrease the speed of the other hydrostatic transmission in order to eliminate the speed differential between the two hydrostatic transmissions.

Figure 2:
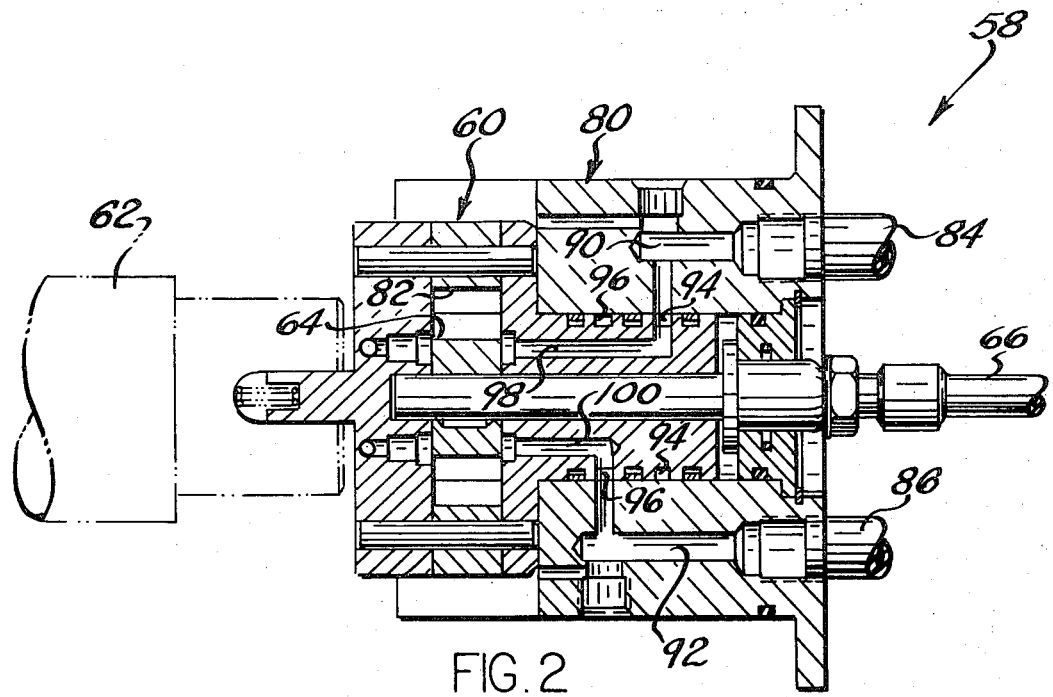
FIG. 2 is an enlarged sectional view of a pump assembly having a rotor which is rotated at a speed which varies with variations in the speed at which an associated track of the vehicle is driven and a housing which is rotated at a speed which varies with variations in the speed which the other track of the vehicle is driven.
Figure 4:
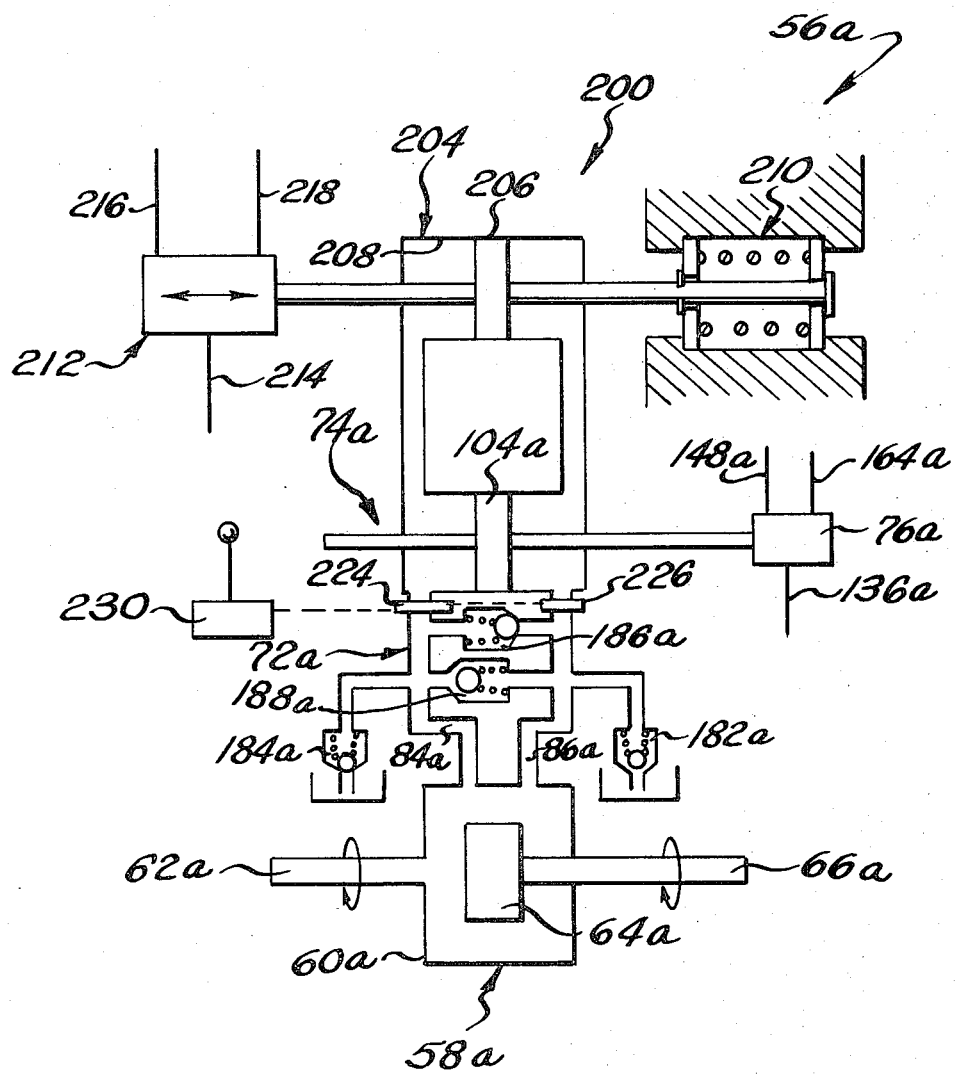
FIG. 4 is a schematic illustration of a second embodiment of the invention.

The embodiment of the invention illustrated in FIG. 4 operates in much the same manner as the embodiment of the invention as illustrated in FIGS. 1-3. Therefore, components of the embodiment of the invention illustrated in FIG. 4 are designated with numerals which are the same as the numerals utilized to designate similar components in the embodiment of the invention illustrated in FIGS. 1-3. However, the suffix letter "a" is utilized with the numeral associated with the embodiment of the invention illustrated in FIG. 4 in order to avoid confusion.

The control system 200 is operated in response to relative rotation between a rotor 64a connected with the motor 32 of the right hand hydrostatic transmission 20 by drive shaft 66a and a housing 60a connected with the motor 30 of a left hand hydrostatic transmission 18 by a drive shaft 62a. Upon relative rotation between the rotor 64a and housing 60a, fluid is discharged from the pump assembly 58a to a conduit arrangement 72a. This fluid moves a piston 104a in the piston and cylinder assembly 74a to actuate a control valve assembly 76a to port fluid to either the conduit 148a or the conduit 164a which are connected with opposite ends of a actuator assembly 50 for the pump unit 24 of the right hand hydrostatic transmission in the manner illustrated in FIG. 3 for the valve assembly 76.

Assuming that the output speed of the right hand hydrostatic transmission 20 is greater than the output speed of the left hand hydrostatic transmission 18, the actuator assembly 50 is activated to decrease the output speed of the right hand hydrostatic transmission 20. If there is a relatively large difference in the output speeds of the left and right hand hydrostatic transmissions, the pump assembly 58a will continue to discharge fluid under pressure into the conduit arrangement 72a after the piston and cylinder assembly 74a is operated to its fully actuated condition. In accordance with the embodiment of the invention illustrated in FIG. 4, this increase fluid pressure is utilized to actuate a second piston and cylinder assembly 204 which is associated with the left hydrostatic transmission 18.

The piston and cylinder assembly 204 includes a piston 206 which is movable axially in a cylinder 208 against the influence of a biasing spring arrangement 210. Movement of the piston 206 actuates a valve assembly 212, which is constructed in the same manner as the valve assembly 76a, to port fluid from a supply line 214 to either a conduit 216 or a conduit 218. The conduits 216 and 218 are connected with the actuator assembly 48 for the pump unit 22 of the left hand hydrostatic transmission 18.

Actuation of the valve assembly 212 ports fluid to vary the output speed of the left hand hydrostatic transmission 18 in the same manner as in which actuation of the valve 76a ports fluid to vary the output speed of the right hand hydrostatic transmission. However, it should be noted that the valve 212 is actuated in the opposite direction as the valve 76a. Therefore, when the valve 76a has been actuated to port fluid under pressure to effect an increase in the output speed of the right hand hydrostatic transmission 20, the valve 212 is actuated to port fluid under pressure to effect a decrease in the output speed of the left hand hydrostatic transmission.

Similarly, if the valve 76a is actuated to increase in the output speed of the right hand hydrostatic transmission, the valve 212 is actuated to effect a decrease in the output speed of the left hand hydrostatic transmission.

In the embodiment of the invention illustrated in FIG. 4, a pair of pressure relief valves 186a and 188a are connected across the contuits 84a and 86a to relieve excessive fluid pressures in either of the piston and cylinder assembly 74a or the piston and cylinder assembly 204. In addition, a pair of check valves 182a and 184a enable fluid to flow from a reservoir to the conduit arrangement 72a.

During turning of the vehicle 10, it is necessary to have one of the tracks 14 or 16 speed up relative to the other track. If the straight tracking control system 56 of FIG. 1 or 56a of FIG. 4 was effective during turning of the vehicle, one of the tracks would not slow down relative to the other track to turn the vehicle. Accordingly, a pair of shut off valves 224 and 226 are provided in association with the fluid conduits 84a and 86a (see FIG. 4). The valves 224 and 226 are operated from their normal open condition to a closed condition blocking fluid flow from the pump assembly 58a in response to actuation of a turn signal unit 230. Thus, upon actuation of the turn signal unit 230 to indicate either a right or left hand turn, the valves 224 and 226 are closed to render the straight tracking control system 56a ineffective to compensate for a difference in speed between the tracks 14 and 16 of the vehicle 10.

Although valves similar to the valves 224 and 226 have not been illustrated in connection with the embodiment of the invention of FIG. 1-3, it should be understood that it is contemplated that similar valves will be utilized in association with the conduits 84 and 86. Although the shut off valves 224 and 226 are illustrated in FIG. 4 as being closed upon actuation of the turn signal 230, it is contemplated that the shut off valves 224 and 226 could be closed in response to actuation of either one of the steering control valves 44 or 46 (see FIG. 1). To effect actuation of the shut off valves 224 and 226, it is contemplated that a suitable switch would be associated with each of the steering valves to energize solenoids for operating the shut off valves to the closed condition.

In the embodiment of the invention as illustrated in FIG. 4, a double acting biasing spring assembly 210 has been illustrated in association with the piston assembly 204. However, it is contemplated that a similar biasing spring assembly could be associated with the piston and cylinder assembly 74a. If this were done, the biasing spring assembly 210 would be stiffer or stronger than the biasing spring assembly associated with the piston and cylinder 74a. This would enable the piston and cylinder assembly 74a to be actuated under the influence of a lower pressure differential between the conduits 84a and 86a then the piston and cylinder assembly 204. By providing biasing spring assemblies with different spring rates, sequential operation of the valve assemblies 76a and 212 would be obtained to provide for a sequential variation in the output speeds of the left and right hand hydrostatic transmissions.

In view of the foregoing description, it can be seen that the straight tracking control system 56 is used in association with the vehicle 10 having a pair of tracks 14 and 16 which are driven by left and right hand hydrostatic transmissions 18 and 20. The straight tracking control system 56 includes a pump assembly 58 which provides a fluid output signal which varies as a function of variations of the speed at which the tracks 14 and 16 are driven relative to each other. The pump assembly 58 includes a rotor 64 which is rotated by an output shaft 66 at a speed which varies as a function of variations at a speed which the right hand track 16 is driven. The pump assembly 58 also includes a rotatable housing 60 which is driven by an input shaft 62 at a speed which varies as a function of variations in the speed at which the track 14 of the vehicle is driven. The control assembly 70 is connected with the pump assembly 58 and is operated under the influence of fluid discharged from the pump assembly to vary the output speed of the right hand hydrostatic transmission 20. In the embodiment of the invention illustrated in FIG. 4, the control assembly 200 is effective to vary the output speed of both of the hydrostatic transmissions 18 and 20.

Although the straight tracking control system 56 has been disclosed herein in connection with a vehicle 10 having a pair of tracks 14 and 16, it is contemplated that the straight tracking control system could be associated with a vehicle having wheels or other known drive systems. In addition, it should be noted that although the housing 60 and rotor 64 and the pump assembly 58 are driven directly from the motor units 30 and 32 by the shafts 62 and 66, it is contemplated that the housing 60 and rotor 64 could be driven by drive arrangement connected directly to the tracks 14 independently of the motor units 30 and 32. In the embodiment of the invention illustrated in FIG. 4, the piston and cylinder assemblies 74a and 204 have been illustrated as being operable to either increase or decrease the output speed of the associated hydrostatic transmissions. It is contemplated that under certain circumstances it may be desirable to have the piston and cylinder assemblies 74a and 204 connected in such a manner that they are effective to only decrease the output speed of the associated hydrostatic transmission.

Having described a specific preferred embodiment of the invention, the following is claimed:

We claim:

1. A hydrostatic transmission control system for use in association with a vehicle having first and second tracks driven by first and second hydrostatic transmissions, said hydrostatic transmission control system comprising pump means for providing an output signal which varies as a function of variations in the speed at which the tracks are driven relative to each other, said pump means including a rotor associated with the first track and a rotatable housing at least partially enclosing said rotor and associated with the second track, said rotor and housing including means for providing a fluid output signal upon relative rotation between said rotor and housing, first drive means for rotating said rotor at a speed which varies as a function of variations in the speed at which the first track is driven, second drive means for rotating said housing at a speed which varies as a function of variations in the speed at which the second track is driven, and control means connected with said pump means for varying the speed at which at least one of the hydrostatic transmissions drives at least one of the tracks in response to an output signal from said pump means.

2. A hydrostatic transmission control system as set forth in claim 1 wherein said output signal from said pump means has a fluid pressure characteristic which increases as the difference between the speed at which the first and second tracks are driven increases, said control means including first means for varying the speed at which one of said hydrostatic transmission drives one of said tracks in response to variation of said fluid pressure characteristic within a first range of pressures and second means for varying the speed at which the other one of said hydrostatic transmissions drives the other track in response to variation of said fluid pressure characteristic within a second range of pressures.

3. A hydrostatic transmission control system as set forth in claim 1 wherein said control means includes means for increasing the output speed of one of the hydrostatic transmissions in response to relative rotation between said rotor and housing in a first direction and for decreasing the output speed of said one hydrostatic transmission in response to relative rotation between said rotor and housing in a second direction.

4. A hydrostatic transmission control system as set forth in claim 1 wherein said housing includes first surface means for defining a pumping chamber, said rotor being disposed in said pumping chamber and having second surface means for cooperating with said first surface means to pump fluid from said pumping chamber upon relative rotation between said rotor and housing.

5. A hydrostatic transmission control system as set forth in claim 4 further including a first conduit means connected in fluid communication with said pumping chamber for conducting fluid at a first pressure to said pumping chamber upon relative rotation between said rotor and housing in a first direction and for conducting fluid from said pumping chamber at a second pressure which is greater than said first pressure upon relative rotation between said rotor and housing in a second direction.

6. A hydrostatic transmission control system as set forth in claim 5 further including second conduit means connected in fluid communication with said pumping chamber for conducting fluid at a third pressure to said pumping chamber upon relative rotation between said rotor and housing in said second direction and for conducting fluid from said pumping chamber at a fourth pressure which is greater than said third pressure upon relative rotation between said rotor and housing in said first direction.

7. A hydrostatic transmission control system as set forth in claim 6 further including valve means for blocking fluid flow through at least one of said conduit means upon turning of the vehicle.

8. A hydrostatic transmission control system as set forth in claim 6 wherein said control means includes piston and cylinder means connected in fluid communication with said first and second conduit means, said piston and cylinder means being operable in one direction from an initial position under the influence of fluid at said second pressure upon relative rotation between said rotor and housing in said second direction, said piston and cylinder means being operable in another direction from the initial position under the influence of fluid at said fourth pressure upon relative rotation between said rotor and housing in said first direction.

9. A hydrostatic transmission control system as set forth in claim 8 wherein said control means further includes actuator means operable in one direction to increase the output speed of said one of said hydrostatic transmissions and in another direction to decrease the output speed of said one of said hydrostatic transmissions and valve means connected in fluid communication with said actuator means, said valve means being operable from a first condition to a second condition to port fluid under pressure to effect operation of said actuator means to increase the output speed of said one hydrostatic transmission and being operable from said first condition to a third condition to port fluid under pressure to effect operation of said actuator means to decrease the output speed of said one hydrostatic transmission, said piston and cylinder means being connected with said valve means to effect operation of said valve means to the second condition upon operation of said piston and cylinder means in said one direction from said initial position and to effect operation of said valve means to the third condition upon operation of said piston and cylinder means in said other direction from said initial position.

10. A hydrostatic transmission control system as set forth in claim 6 wherein said control means includes first piston and cylinder means connected in fluid communication with said first fluid conduit means for varying the output speed of said first hydrostatic transmission and second piston and cylinder means connected in fluid eommunication with said second fluid conduit means for varying the output speed of said second hydrostatic transmission.

11. A hydrostatic transmission control system as set forth in claim 10 further including biasing means connected with at least one of said piston and cylinder means for moving said one of said piston and cylinder means from an operated condition toward an initial condition upon a reduction in the fluid pressure in one of said conduit means.

12. A hydrostatic transmission control system as set forth in claim 1 further including conduit means for connecting said pump means in fluid communication with said control means, said pump means being operable to communicate to said conduit means a fluid output signal having a pressure characteristic which varies as a function of the speed of relative rotation between said rotor and housing.

13. A hydrostatic transmission control system as set forth in claim 1 further including conduit means for connecting said pump means in fluid communication with said control means and a source of fluid, and check valve means for enabling fluid to flow from said source of fluid to said pump means through said conduit means and for blocking fluid flow from said pump means to said source of fluid during relative rotation between said rotor and housing.

14. A hydrostatic transmission control system as set forth in claim 13 wherein said conduit means includes first conduit means for conducting fluid from said source of fluid to said pump means during relative rotation between said rotor and housing in a first direction and for conducting fluid from said pump means to said control means during relative rotation between said rotor and housing in a second direction and second conduit means for conducting fluid from said source of fluid to said pump means during relative rotation between said rotor and housing in the second direction and for conducting fluid from said pump means to said control means during relative rotation between said rotor and housing in the first direction, said valve means including first valve means for enabling fluid to flow through said first conduit means from said source of fluid to said pump means during relative rotation between said rotor and housing in the first direction and for blocking fluid flow through said first conduit means from said pump means to said source of fluid during relative rotation between said rotor and housing in the second direction and second valve means for enabling fluid to flow through said second conduit means from the source of fluid to said pump means during relative rotation between said rotor and housing in the second direction and for blocking fluid flow through said second conduit means from said second conduit means from said pump means to said source of fluid during relative rotation between said rotor and housing in the first direction.

15. A hydrostatic transmission control system for use in association with first and second members driven by first and second hydrostatic transmissions, said hydrostatic transmission control system comprising pump means for providing an output signal which varies as a function of variations in the speed at which the members are driven relative to each other, said pump means including a rotor associated with the first member and a rotatable housing at least partially enclosing said rotor and associated with the second member, said rotor and housing including means for providing a fluid output signal upon relative rotation between said rotor and housing, first drive means for rotating said rotor at a speed which varies as a function of variations in the speed at which the first member is driven, second drive means for rotating said housing at a speed which varies as a function of variations in the speed at which the second member is driven, and control means connected with said pump means for varying the speed at which at least one of the hydrostatic transmissions drives at least one of the members in response to an output signal from said pump means.

16. A hydrostatic transmission control system as set forth in claim 15 wherein said output signal from said pump means has a fluid pressure characteristic which increases as the difference between the speed at which the first and second members are driven increases, said control means including first means for varying the speed at which one of said hydrostatic transmissions drives one of said members in response to variation of said fluid pressure characteristic within a first range of pressures and second means for varying the speed at which the other one of said hydrostatic transmissions drives the other member in response to variation of said fluid pressure characteristic within a second range of pressures.

17. A hydrostatic transmission control system as set forth in claim 15 wherein said control means includes means for increasing the output speed of one of the hydrostatic transmissions in response to relative rotation between said rotor and housing in a first direction and for decreasing the output speed of said one hydrostatic transmission in response to relative rotation between said rotor and housing in a second direction.

18. A hydrostatic transmission control system as set forth in claim 15 wherein said housing includes first surface means for defining a pumping chamber, said rotor being disposed in said pumping chamber and having second surface means for cooperating with said first surface means to pump fluid from said pumping chamber upon relative rotation between said rotor and housing.

* * * * *